UNITED STATES PATENT OFFICE.

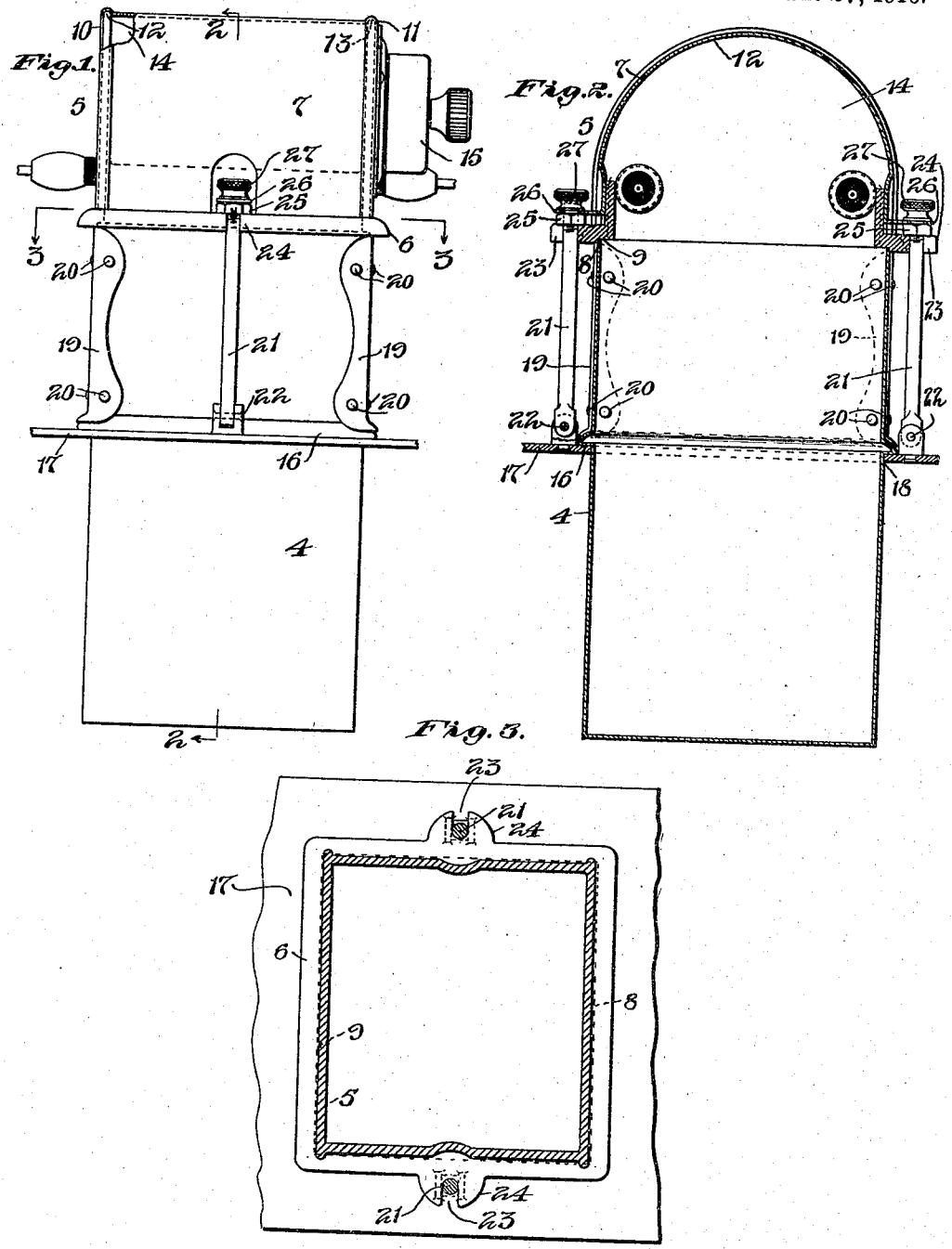

ELLSWORTH A. HAWTHORNE, OF BRIDGEPORT, CONNECTICUT.

BATTERY-CASING.

1,188,649.

Specification of Letters Patent. Patented June 27, 1916.

Application filed September 24, 1913. Serial No. 791,675.

*To all whom it may concern:*

Be it known that I, ELLSWORTH A. HAWTHORNE, a citizen of the United States, and a resident of Bridgeport, in the county of Fairfield and State of Connecticut, have invented an Improvement in Battery-Casings, of which the following description, in connection with the accompanying drawings, is a specification, like characters on the drawings representing like parts.

This invention relates to battery casings, or housings, and more especially though not exclusively to a casing intended to house a storage battery, a switch and connections from the battery to the switch, as well as the leads from the switch to the lamps, or other apparatus controlled thereby.

The casing is particularly adapted for use as a housing for the battery of a lighting system for a vehicle, such for example as a motor cycle.

My invention will be best understood by reference to the following specification, taken in connection with the accompanying drawings of one specific embodiment thereof, while its scope will be more particularly pointed out in the appended claims.

In the drawings: Figure 1 is an elevation of the battery casing or housing embodying my invention; Fig. 2 is a sectional view on line 2—2 of Fig. 1; and Fig. 3 is a plan section on line 3—3 of Fig. 1.

Referring to the drawings, and to the embodiment of my invention which I have selected for illustration, I have there shown a battery casing or housing comprising a plurality of sections including a body 4 and a cover 5, the latter herein comprising a frame 6 and a shell 7, constituting a closure for the frame. The frame 6 is herein provided with a recess 8, seated upon the upper edge of the body 4, thus insuring a tight joint between the parts. This recess also forms an inwardly projecting shoulder 9, which is intended to rest upon the margin of the top of the battery and firmly hold the latter in place.

The frame 6 of the cover is herein provided with integral ends 10 and 11, of generally semi-circular form, provided with two rounded marginal beads 12 and 13 forming seats for the shell 7, which is of generally semi-cylindrical form and closes the space between the ends 10 and 11 of the cover frame. In practice, it is found most convenient to make the frame of cast metal, and the shell of thin sheet metal stamped into the desired form to fit onto the frame and complete the cover. This cover forms a chamber 14 in the upper part of the casing, to receive the connections leading from the battery terminals, not shown, to an appropriate switch 15, herein mounted on the end wall 11 of the cover frame. This chamber is also intended to receive the connections or leads extending from the switch to the lamps or other apparatus. The casing may be otherwise appropriately mounted, but herein the body 4 is provided with a laterally projecting integral flange in the form of a body 16, seating upon an appropriate support 17, herein consisting of a plate provided with an aperture 18, through which the body depends. The body 4 may be otherwise appropriately formed, but it is found most convenient to make it from a sheet metal blank in the form of a Maltese cross, whose arms are bent to form the side walls of the casing and are united to each other by corner pieces 19, secured thereto by rivets 20. The casing may be secured to its support, and the cover may be secured to the body of the casing by any other appropriate means, but herein I have provided a pair of bolts 21 hinged at 22 to the support 17, and extending upwardly through slots 23 in a pair of laterally projecting lugs 24 on the frame 6. A pair of nuts 25 threaded onto these bolts bear against the lugs, and serve to draw the cover frame firmly upon the body of the casing and hold it in place.

The cover shell 7 may be otherwise appropriately secured to the frame 6, but is herein provided with a pair of lugs 26, through which the bolts 21 extend, and the latter are provided with nuts 27 bearing against the lugs and securely holding the shell in place upon the cover. Should it become necessary at any time to get at the wiring within the casing, this may be accomplished very readily by simply unscrewing the nuts 27 and lifting the cover shell 7, thus exposing the interior of the casing. If at any time it should become necessary to entirely remove the cover, as for example to remove the battery and replace it by another, this may be accomplished by simply loosening the nuts 25 very slightly, and swinging the bolts 21 out of their slots 23, thus freeing the cover frame and allowing the entire cover to be lifted from its place.

While I have herein shown and described one form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:—

1. The combination of a support, a casing comprising three parts one of which is seated upon and separable from said support, the other two parts constituting a cover seated upon the first part, each of said cover parts being provided with a pair of lugs, a pair of bolts secured to said support and extending through said pairs of lugs, and pairs of nuts threaded onto said bolts and bearing against said pairs of lugs, respectively.

2. A battery casing comprising, in combination, a body, a cover comprising a frame having an opening and provided with a pair of lugs, and a shell constituting a closure for the opening of said frame and also provided with a pair of lugs, and means to secure said body, frame and shell together, including a pair of bolts passing through said pairs of lugs.

3. A battery housing comprising, in combination, a support provided with an aperture, a casing extending through said aperture and having laterally projecting means resting upon and separable from said support adjacent said aperture, said casing being provided with a pair of oppositely disposed slotted lugs, and means to hold said casing seated upon said support, including a pair of bolts hinged to said support adjacent said aperture and extending through said lugs, and nuts threaded onto said bolts and bearing against said lugs.

4. A battery casing comprising, in combination, a body, a cover comprising a frame having an opening and a shell constituting a closure for the opening and fastening means securing said body, frame and shell together and engaging both frame and shell.

5. The combination of a support, a casing comprising three parts one of which is seated on and separable from said support, the other two parts constituting a cover seated on the first part and fastening means secured to said support and engaging both said last mentioned parts to secure them together and to said first mentioned part.

6. The combination of a support, having an aperture, a receptacle fitted to and suspended by said support, a cover for said receptacle and fastening devices engaging said support and said cover and holding the cover to the receptacle and the receptacle in the aperture.

In testimony whereof, I have signed my name to this specification, in the presence of two subscribing witnesses.

ELLSWORTH A. HAWTHORNE.

Witnesses:
E. HORACE HAWTHORNE,
BENJAMIN A. BOZAR.

Copies of this patent may be obtained for five cents each, by addressing the "Commissioner of Patents, Washington, D. C."